United States Patent Office 3,494,605
Patented Feb. 10, 1970

3,494,605
PROCESS FOR PREPARING BETA-HYDROXY-ALKYL ESTERS OF POLYMERIZABLE ACIDS
John W. Rehfuss, Louisville, Ky., assignor to Celanese Coatings Company, New York, N.Y., a corporation of Delaware
No Drawing. Filed Mar. 2, 1967, Ser. No. 619,928
Int. Cl. C07c 69/54
U.S. Cl. 260—486                            8 Claims

ABSTRACT OF THE DISCLOSURE

A process for preparing beta-hydroxyalkyl esters of polymerizable acids by reacting a monoepoxide, such as propylene oxide, with a polymerizable acid, such as methacrylic acid, using as a catalyst an alkyl or aryl mercaptan or thioether.

BACKGROUND OF THE INVENTION

The field of art to which this invention pertains is process for making acyclic esters of unsaturated acids, particularly the process for preparing beta-hydroxyalkyl esters of polymerizable acids by the reaction of alkylene oxides with the acids.

Processes for preparing beta-hydroxyalkyl esters of polymerizable acids have long been known. Such processes have been conducted by reacting an alkylene oxide with an unsaturated acid using basic or acidic catalysts and are described in U.S. Patents 2,484,487; 2,819,296; 2,929,835; 3,059,024; 3,162,677; 3,150,167 and 3,174,995. As pointed out in these patents the catalyzed reaction of an alkylene oxide with an acid results in the formation of a beta-hydroxyalkyl ester of the acid by the opening of the oxirane ring and subsequent addition of the opened ring to the acid. In this reaction, particularly when reacted to completion, as evidenced by a low acid value, some diester is formed through esterification of the acid with the formed beta-hydroxy group or by transesterification between two beta-hydroxyalkyl esters. The presence of diester which contains two polymerizable bonds, is undesirable in the product. When the beta-hydroxyalkyl ester is homo- or copolymerized to make useful products, small amounts of diester cause premature gelation and crosslinking. Useful beta-hydroxyalkyl esters substantially free of diester have been obtained by purification of the product through distillation or extraction techniques.

Beta-hydroxyalkyl esters, substantially free of diester, have also been made by stopping the reaction of the alkylene oxide and the acid before completion, i.e., before the acid value reaches zero. Such products, particularly when made with basic catalysts, have been successfully utilized in polymerization reactions without premature gelation. However, the crude, undistilled material is somewhat unstable and cannot be preserved for long periods of time without formation of the diester.

The presence of catalysts, as used in the aforementioned patents, can have a detrimental effect upon coating compositions, particularly pigmented coatings, made from polymers and copolymers of the crude beta-hydroxyalkyl esters. The catalysts, even in trace amounts, can react with certain pigments causing the coating to be mottled or uneven in color.

SUMMARY OF THE INVENTION

By this invention, beta-hydroxyalkyl esters of polymerizable acids are prepared by reacting an epoxide compound containing only one 1,2 epoxy group with a polymerizable carboxylic acid using as a catalyst an organic bivalent sulfur compound. More particularly, this invention pertains to the use of mercaptans and thioethers as catalysts for the reaction of monoepoxides with polymerizable carboxylic acids.

By this invention, beta-hydroxyalkyl esters of polymerizable acids can be made which do not require purification before use. The produced beta-hydroxyalkyl esters are substantially free of diesters containing two polymerizable double bonds as evidenced by no gelation or tendency to crosslink upon subsequent polymerization. These esters are stable in the crude (undistilled or unpurified) form and can be kept for long periods of time with no deterioration in usefulness. The organic bivalent sulfur catalysts do not have to be removed from the esters prior to use. Coating compositions made from pigmented polymers of the esters with sulfur catalysts still present exhibit excellent film durability and color uniformity.

DESCRIPTION OF THE INVENTION

The acids useful in preparing the beta-hydroxyalkyl ester are polymerizable ethylenically unsaturated carboxylic acids which contain one or two carboxylic acid groups and one polymerizable ethylenically unsaturated group and no other groups which are reactive with epoxide groups. Examples of such acids include acrylic acid, angelic acid, cinnamic acid, methacrylic acid, crotonic acid, maleic acid, fumaric acid, itaconic acid and half esters of maleic and fumaric acid which are derivatives of the dibasic acid and one equivalent of a monohydric alkanol containing 1 to 20 carbon atoms. The preferred acids are three and four carbon monoethylenically unsaturated monocarboxylic acids, particularly acrylic and methacrylic acid.

The epoxide compounds useful in this invention are those which contain one three-membered epoxide group and no other groups reactive with epoxide or carboxylic acid groups. Examples of such compounds include ethylene oxide, propylene oxide, 1,2-butylene oxide, 2,3-butylene oxide, 1,2-hexylene oxide and 5,6-decylene oxide, i.e., alkylene oxides containing 2 to about 20 carbon atoms. Additional monoepoxides are styrene oxide, butyl glycidyl ether, phenyl glycidyl ether, cresyl glycidyl ether, glycidyl acetate, glycidyl benzoate and the like. The preferred epoxide compounds are alkylene oxides of 2 to 3 carbon atoms with the most preferred being propylene oxide.

The compounds which are used as catalysts in this invention are mercaptans and thioethers which contain at least one bivalent alkyl or aryl substituted sulfur atom and no other groups reactive with epoxide and acid groups except hydroxyl and carboxylic acid groups.

Useful mercaptans are alkyl and aryl mercaptans which contain at least one —SH group and from 1 to about 24 carbon atoms for each sulfur atom. Examples of such mercaptans are methyl mercaptan, ethyl mercaptan, propyl mercaptan, butyl mercaptan, amyl mercaptan, octyl mercaptan, tetradecyl mercaptan, cetyl mercaptan, allyl mercaptan, cyclohexyl mercaptan, cyclopentylmethyl mercaptan and cycloheptyl mercaptan. Also included are the dimercaptans as exemplified by ethanedithiol-1,2; propanedithiol-1,2; butanedithiol-2,3; hexanedithiol-1,2; 2,6-dimethyloctanedithiol-3,7 and pentadecanedithiol-7,8. Other useful polythiols are propanetrithiol-1,2,3; neopentanetetrathiol and the like.

Other suitable mercaptans are those which contain substituents such as hydroxyl, carboxyl, alkoxyl, aroxyl and carbonyl. Practically any substituted mercaptan is suitable for use as a catalyst provided that the substituents, other than hydroxyl or carboxyl, are non-reactive with carboxylic acid or epoxide groups under the conditions of the reaction. Examples of substituted mercaptans are dimercaptopropanol, beta-hydroxyethyl mercaptan, beta-hydroxypropyl mercaptan, 3-hydroxypropyl mercaptan, hydroxybutyl mercaptan, 2-mercapto-cyclopentanol, monothioglycerol, beta-methoxyethyl mercaptan, beta-ethoxypropyl mercaptan, dimercaptoacetone, 1-mercapto-2-octanone, 2-methyl-2-mercaptopentanone-4, mercaptoacetophenone, mercaptoanthroquinone, thioglycolic acid, thiolactic acid, betamercaptopropionic acid, mercaptobutyric acid, mercaptovaleric acid, ethyl thioglycolate, methyl thiobutyrate, dimercaptodiethyl ether and the like.

Thioethers, which are useful as catalysts, are alkyl and alkyl and aryl sulfides which contain at least one —S— group and from 1 to about 24 carbon atoms in each alkyl or aryl substituent. Examples of such thioethers are dimethyl sulfide, methyl ethyl sulfide, dipropyl sulfide, dibutyl sulfide, diheptyl sulfide, ethylbutyl sulfide, methyl allyl sulfide, dinonyl sulfide, dicyclohexyl sulfide, methylcetyl sulfide, methylphenyl sulfide, diphenyl sulfide, ethyl thio ethyl methacrylate, etc. Also included are the cyclic sulfides, such as thiophane, pentamethylene sulfide, thiophanone and hexamethylene sulfide.

Additional suitable mercaptans and thioethers can be found in "Organic Chemistry of Bivalent Sulfur," volumes I, II and III, by E. E. Reid, Chemical Publishing Company, Inc., New York, N.Y. (1960).

In carrying out the process of this invention, the monoepoxy compound and the polymerizable acid are reacted in approximately equivalent portions, i.e., about one mol of monoepoxide per equivalent of acid. However, a slight excess of monoepoxide, up to about 1.1 mol per equivalent of acid, can be used if a low acid value product is desired.

The organic bivalent sulfur compound is used in catalytic quantities, from about 0.1 to about 3.0 percent by weight based on the total weight of the reactants.

It is desirable to use polymerization inhibitors in this process to prevent excessive polymerization of the polymerizable acid during the reaction. Well known inhibitors such as hydroquinone, hydroquinone methyl ether, catechol, t-butyl catechol and the like, can be used in amounts from about 100 to about 2000 p.p.m. of reactants.

The process of this invention is conducted at a temperature of about 180° F. to about 240° F. at atmospheric or superatmospheric pressures. The rate of reaction is very slow if temperatures much below 180° F. are used. At temperatures much above 240° F., the unsaturated acid has a tendency to homopolymerize. The process is conducted for a time sufficient to substantially complete the reaction between the monoepoxide and the acid. The extent of reaction is determined by acid value analysis. An acid value of 0 indicates complete reaction. However, in order to prevent excessively long reaction times and by-product formation, the reaction is generally conducted to an acid value of about 15 to 30. The time required to reach the desired acid value will vary depending upon the temperature of reaction, the particular catalyst and the amount of catalyst as well as the particular epoxide compound and acid. Generally the time of reaction will vary between about 5 hours to 20 hours.

The preferred method for carrying out the process of this invention is to heat the acid with the catalyst and inhibitor present to the desired temperature and then to gradually add the monoepoxide at a rate about equal to its reaction rate with the acid. The temperature generated by the exothermic reaction is easily controlled and excessive buildup of unreacted epoxide is prevented with the resulting decrease in undesirable side reactions, such as epoxide homopolymerization.

After the reaction of monoepoxide and polymerizable acid is completed, the beta-hydroxyalkyl ester is ready for use. No distillation and purification of the product is necessary although such purification is not precluded if an ultra-pure product is desired. The unpurified product can be copolymerized with a wide variety of polymerizable monomers to form polymers having utility in the decorative and protective coatings field.

The invention is further described by the following examples. Parts where used are parts by weight.

EXAMPLE 1

Monomer preparation

To a suitable reactor equipped with a thermometer, mechanical stirrer, condenser and inlet tube were added 1194 parts of methacrylic acid, 16 parts of the methyl ether of hydroquinone and 20 parts of dimercapto-propanol. Agitation was begun and heat was applied. When the temperature of the reactor contents reached 210° F. slow addition of 806 parts of propylene oxide was begun. All of the propylene oxide was added to the reactor over a four-hour period while keeping the temperature between 208° F. and 210° F. The acid value at this time was 95.3. Heating at 204° F. to 214° F. was continued for about 8 hours until the acid value of the reaction product was 32.7. The reaction product was substantially pure hydroxypropyl methacrylate as determined by gas chromatographic analysis.

EXAMPLE 2

Monomer preparation

To a suitable reactor equipped as described in Example 1 were added 1194 parts of methacrylic acid, 22 parts of dimercapto-diethyl ether, 6 parts of the methyl ether of hydroquinone and 202 parts of propylene oxide. Heat was applied raising the temperature slowly to 216° F. over a period of 1 hour and 15 minutes. Propylene oxide, 604 parts, was slowly added over a period of 1 hour and 55 minutes while keeping the temperature at 210° F. to 216° F. Heating in this temperature range was continual for 4 hours and 25 minutes until the acid value of the reactants was 36.3. Substantially pure hydroxypropyl methancrylate was obtained as the product.

EXAMPLE 3

Monomer preparation

Using the same procedure as was described in Example 1, 1194 parts of methacrylic acid were reacted with 806 parts of propylene oxide using 2 parts of the methyl ether of hydroquinone as polymerization inhibitor and 20 parts of poly (ethyl-thio-ethyl methacrylate) as catalyst. Hydroxypropyl methacrylate having an acid value of 50.3 was obtained.

EXAMPLE 4

Copolymer preparation

To a suitable reactor equipped with a thermometer, mechanical stirrer, condenser and dropping funnel were added 1495 parts of xylene and 45 parts of cumene hydroperoxide. To the dropping funnel were added 353 parts of methyl methacrylate (Example 1) and 19 parts of methacrylic acid. Agitation was begun and heat was applied to the reactor. Approximately 10% by weight of the monomers in the dropping funnel were added to the reactor. When the temperature of the reactants reached 288° F., the remaining monomers were added over a 75-minute period while keeping the temperature between 275° F. and 285° F. Heating within this temperature range was continued for 11 hours to complete the polymerization. The resulting copolymer had an acid value of 11.02 on solids basis, a Gardner-Holdt viscosity at 25° C. of J–K at 44.02% solids and a Gardner Color of 1–2.

EXAMPLE 5

Copolymer preparation

Using the same procedure as described in Example 4, 747 parts of styrene, 938 parts of n-butylmethacrylate and 315 parts of hydroxypropyl methacrylate (Example 2) were copolymerized in 1500 parts of xylene using 40 parts of cumene hydroperoxide as catalyst. The resulting product had a Gardner-Holdt viscosity of 25° C. of 0 at 43.31% solids, a Gardner color of less than 1 and an acid value of 5.3 on solids basis.

Copolymers prepared as described in Example 4 and 5 were made into paints by blending and grinding the copolymers with any of the well known paint pigments. These pigmented copolymers were further blended with aminoplast resins, such as alkoxylated urea-formaldehyde and melamine-formaldehyde resins, which serve as cross-linking agents for the copolymers. The pigmented blends were then applied to the desired substrate by spraying, brushing, dipping, etc., and were cured by baking at elevated temperatures. Paint films were obtained which have excellent decorative and protective properties.

It is to be understood that the foregoing detailed description is given merely by way of illustration and that many variations may be made therein without departing from the spirit of the invention.

The embodiments of the invention in which an exclusive property or privilege is claimed are defined as follows:

1. A process for preparing beta-hydroxyalkyl esters of polymerizable acids which comprises reacting at a temperature of about 180° F. to about 240° F.
   (a) a polymerizable ethylenically unsaturated acid having one to two carboxylic acid groups and one polymerizable ethylenically unsaturated group and no other groups reactive with epoxide groups with
   (b) an epoxide compound containing only one 3-membered epoxide group and no other groups reactive with epoxide or carboxylic acid groups using as a catalyst
   (c) a mercaptan or thioether which contains 1 to 24 carbon atoms for each sulfur atom, at least one bivalent alkyl or aryl substituted sulfur group and no other groups except hydroxyl and carboxylic acid groups which are reactive with epoxide or carboxylic acid groups.

2. The process of claim 1 wherein the polymerizable acid is a monoethylenically unsaturated monocarboxylic acid containing three or four carbon atoms and the epoxide containing compound is an alkylene oxide of 2 to 4 carbon atoms.

3. The process of claim 1 wherein the polymerizable acid is methacrylic acid and the epoxide compound is propylene oxide.

4. The process of claim 1 wherein the catalyst is dimercaptopropanol.

5. The process of claim 1 wherein the catalyst is dimercaptodiethyl ether.

6. The process of claim 1 wherein the catalyst is poly-(ethyl-thio-ethyl methacrylate).

7. The process of claim 1 wherein the epoxide compound and the polymerizable acid are in approximately equivalent ratios, the catalyst is present in the amounts of about 0.1 to about 3 percent by weight based on the total weight of reactants.

8. A process for preparing beta-hydroxypropyl methacrylate by the reaction of approximately equimolar amounts of propylene oxide and methacrylic acid at a temperature of 180° F. to 240° F., the improvement which comprises using as a catalyst dimercaptopropanol in the amount of about 1% by weight based on the weight of the reactants.

References Cited

UNITED STATES PATENTS

| 2,236,919 | 4/1941 | Reynhart | 260—635 |
| 2,327,053 | 8/1943 | Marple et al. | 260—615 XR |
| 2,484,487 | 10/1949 | Caldwell | 260—486 |
| 2,962,524 | 11/1960 | Hostettler et al. | 260—484 |
| 3,125,592 | 3/1964 | Nevin | 260—486 XR |

FOREIGN PATENTS 397,758 12/1962 Japan.

LORRAINE A. WEINBERGER, Primary Examiner

A. P. HALLUIN, Assistant Examiner

U.S. Cl. X.R.

260—80.81, 828, 476, 485, 86.1